(12) United States Patent
Yoshimine et al.

(10) Patent No.: US 8,369,583 B2
(45) Date of Patent: Feb. 5, 2013

(54) HYBRID BIOMETRIC AUTHENTICATION DEVICE, HYBRID BIOMETRIC AUTHENTICATION METHOD, AND COMPUTER-READABLE MEDIUM STORING HYBRID BIOMETRIC AUTHENTICATION PROGRAM

(75) Inventors: Tatsuki Yoshimine, Toyohashi (JP); Masaaki Matsuo, Nagoya (JP); Masahiro Hoguro, Kasugai (JP); Taizo Umezaki, Kasugai (JP)

(73) Assignee: Kabushiki Kaisha DDS, Nagoya (JP)

( * ) Notice: Subject to any disclaimer, the term of this patent is extended or adjusted under 35 U.S.C. 154(b) by 343 days.

(21) Appl. No.: 12/838,930

(22) Filed: Jul. 19, 2010

(65) Prior Publication Data
US 2010/0284575 A1  Nov. 11, 2010

Related U.S. Application Data

(63) Continuation-in-part of application No. PCT/JP2009/051479, filed on Jan. 29, 2009.

(30) Foreign Application Priority Data

Jan. 29, 2008 (JP) .................. 2008-018402

(51) Int. Cl.
G06K 9/00 (2006.01)
G06K 9/34 (2006.01)

(52) U.S. Cl. ....................... 382/116; 382/190

(58) Field of Classification Search .......... 382/115–118, 382/125, 190, 218–220; 348/222.1, E05.024; 707/9; 340/5.53, 5.83
See application file for complete search history.

(56) References Cited

U.S. PATENT DOCUMENTS

| | | | |
|---|---|---|---|
| 7,174,036 B2 | 2/2007 | Ohba | |
| 7,804,982 B2 * | 9/2010 | Howard et al. | 382/115 |
| 2004/0213437 A1 * | 10/2004 | Howard et al. | 382/115 |
| 2006/0078177 A1 | 4/2006 | Niinuma et al. | |
| 2010/0080425 A1 * | 4/2010 | Bebis et al. | 382/125 |
| 2010/0284575 A1 * | 11/2010 | Yoshimine et al. | 382/116 |
| 2011/0007174 A1 * | 1/2011 | Bacivarov et al. | 348/222.1 |
| 2011/0135165 A1 * | 6/2011 | Wechsler et al. | 382/118 |

FOREIGN PATENT DOCUMENTS

| | | |
|---|---|---|
| JP | A-2003-162722 | 6/2003 |
| JP | A-2006-085268 | 3/2006 |
| JP | A-2006-107340 | 4/2006 |
| JP | A-2006-167070 | 6/2006 |
| WO | WO 2006/023046 A1 | 3/2006 |

OTHER PUBLICATIONS

International Search Report issued in Application No. PCT/JP2009/051479; Dated Apr. 21, 2009 (With Translation).
International Preliminary Report on Patentability issued in Application No. PCT/JP2009/051479; Dated Aug. 31, 2010.

\* cited by examiner

*Primary Examiner* — Amir Alavi
(74) *Attorney, Agent, or Firm* — Oliff & Berridge, PLC

(57) ABSTRACT

A hybrid biometric authentication device that includes a plurality of feature extraction portions that respectively extract, from biometric information, a plurality of types of feature information that have mutually distinct properties, a feature combining portion that generates hybrid feature information by combining the plurality of types of feature information, a feature information storage portion that stores the hybrid feature information, a plurality of similarity computation portions that separates each of new information and registered information into the plurality of types of feature information, and compute a plurality of degrees of similarity between separate sets of a same type of the feature information, and a determination portion that, based on the plurality of degrees of similarity, determines whether the biometric information on which the new information is based and the biometric information on which the registered information is based have been acquired from a same person.

20 Claims, 10 Drawing Sheets

FIG. 6

| DEGREE OF SIMILARITY A | FAR[%] |
|---|---|
| ∞ | 0 |
| ⋮ | ⋮ |
| 105 | 0.00001 |
| 100 | 0.00002 |
| 95 | 0.00005 |
| 90 | 0.0001 |
| 85 | 0.0002 |
| 80 | 0.0005 |
| 75 | 0.001 |
| 70 | 0.002 |
| 65 | 0.005 |
| 60 | 0.01 |
| 55 | 0.02 |
| 50 | 0.05 |
| 45 | 0.1 |
| 40 | 0.2 |
| 35 | 0.5 |
| 30 | 1 |
| 25 | 2 |
| 20 | 5 |
| 15 | 10 |
| 10 | 20 |
| 5 | 50 |
| 0 | 100 |

FIG. 7

| DEGREE OF SIMILARITY B | FAR [%] |
|---|---|
| ∞ | 0 |
| ⋮ | ⋮ |
| 700 | 0.00001 |
| 670 | 0.00002 |
| 630 | 0.00005 |
| 600 | 0.0001 |
| 570 | 0.0002 |
| 530 | 0.0005 |
| 500 | 0.001 |
| 470 | 0.002 |
| 430 | 0.005 |
| 400 | 0.01 |
| 370 | 0.02 |
| 330 | 0.05 |
| 300 | 0.1 |
| 270 | 0.2 |
| 230 | 0.5 |
| 200 | 1 |
| 170 | 2 |
| 130 | 5 |
| 100 | 10 |
| 70 | 20 |
| 30 | 50 |
| 0 | 100 |

FIG. 8

|    | B1   | B2  | B3  | B4  | B5 | B6 | B7  |
|----|------|-----|-----|-----|----|----|-----|
| A1 | 1600 | 800 | 400 | 200 | 20 | 1  | 1   |
| A2 | 80   | 40  | 20  | 10  | 1  | 1  | 1   |
| A3 | 4    | 4   | 2   | 1   | 1  | 1  | 1   |
| A4 | 2    | 2   | 1   | 1   | 1  | 1  | 1   |
| A5 | 1    | 1   | 1   | 1   | 1  | 1  | X=0 |

HYBRID BIOMETRIC AUTHENTICATION DEVICE, HYBRID BIOMETRIC AUTHENTICATION METHOD, AND COMPUTER-READABLE MEDIUM STORING HYBRID BIOMETRIC AUTHENTICATION PROGRAM

CROSS-REFERENCE TO RELATED APPLICATION

This application is a U.S. continuation-in-part application filed under 35 USC 111(a) claiming benefit under 35 USC 120 and 365(c) of International Application No. PCT/JP2009/051479, filed Jan. 29, 2009, which claims priority to Application Ser. No. 2008-018402, filed in Japan on Jan. 29, 2008. The disclosure of the foregoing applications is hereby incorporated by reference in its entirety.

BACKGROUND

The present disclosure relates to a hybrid biometric authentication device, a hybrid biometric authentication method, and a computer-readable medium that stores hybrid biometric authentication program.

Individual authentication technologies are currently in use in various types of devices, such as door locks, cash dispensing machines (Automated Teller Machines), and the like in order to identify the users of the devices. Attention is being focused on authentication technologies that utilize biometric information, because they are very convenient for the users, since the objects and information that are used for authentication cannot be lost or forgotten. However, with individual authentication (biometric authentication) that utilizes biometric information, there may be cases in which the accuracy of authentication and matching is not adequate, depending on its application.

Accordingly, for authentication that is used for large numbers of users and at public facilities, biometric authentication is frequently not used alone, but is used in combination with authentication by a key, an IC card, or the like, or with authentication by a password, a pass phrase, or the like that is memorized by the user.

Various types of methods have also been proposed for improving the accuracy of biometric authentication. For example, a method has been proposed in which different types of biometric information (for example, a fingerprint plus a face, or the like) are obtained from a plurality of biometric information input devices, biometric feature information is extracted from each type of biometric information, and degrees of similarity are computed by matching processing. Then a determination is made, based on the degrees of similarity, as to whether the user is or is not who the user claims to be.

A method has also been proposed that seeks to improve the accuracy of matching by acquiring a plurality sets of biometric information from a single biometric information input device, then making a comprehensive evaluation of feature information obtained from the plurality sets of biometric information and the order in which the plurality sets of biometric information was input.

SUMMARY

In a case where a plurality of the authentication technologies that are described above (for example, biometric authentication plus authentication by a password or the like) are used in conjunction with one another, as well as in a case where a plurality of authentication elements (for example, a fingerprint plus a face, or the like) are used in conjunction with one another, the problems listed below may occur.

(1) With authentication that uses an object such as a key, an IC card, or the like, for example, the object that is used for authentication may be lost, and the management of the object is burdensome.

(2) With authentication based on information memorized by a human being, such as a password or the like, the information that is used for authentication may be forgotten.

(3) With biometric authentication that uses a combination of a plurality of authentication elements, the cost of the equipment, such as biometric information input devices and the like, increases, the operation becomes more complex, and the burden on the user becomes greater.

(4) In the case of biometric authentication that uses a combination of a plurality of authentication elements, the system becomes more cumbersome, because the biometric information may be rejected due to an input failure, and re-input may be required separately for each of the authentication elements.

(5) With a method in which a plurality sets of biometric information are acquired by a single biometric information input device, the convenience for the user is diminished, because the biometric information needs to be acquired a plurality of times in order to improve the accuracy of the matching.

Various exemplary embodiments of the general principles described herein provide a hybrid biometric authentication device, a hybrid biometric authentication method, and a computer-readable medium that stores hybrid biometric authentication program for which the object of authentication is not lost or forgotten, the implementation cost is low, and the system configuration and operation are simple.

Exemplary embodiments provide a hybrid biometric authentication device that includes a plurality of feature extraction portions, a feature combining portion, a feature information storage portion, a plurality of similarity computation portions, and a determination portion. The plurality of feature extraction portions respectively extract, from biometric information, a plurality of types of feature information that have mutually distinct properties. The feature combining portion generates hybrid feature information by combining the plurality of types of feature information respectively extracted by the plurality of the feature extraction portions. The feature information storage portion stores the hybrid feature information generated by the feature combining portion. The plurality of similarity computation portions separate each of new information and registered information into the plurality of types of feature information before combined, and compute a plurality of degrees of similarity between separate sets of a same type of the feature information that have been respectively separated from the new information and the registered information. The new information is the hybrid feature information newly generated by the feature combining portion. The registered information is the hybrid feature information stored in advance in the feature information storage portion. The determination portion, based on the plurality of degrees of similarity computed by the plurality of similarity computation portions, determines whether the biometric information on which the new information is based and the biometric information on which the registered information is based have been acquired from a same person.

Exemplary embodiments also provide a hybrid biometric authentication method that includes the steps of extracting, from biometric information, a plurality of types of feature information that have mutually distinct properties, generating hybrid feature information by combining the plurality of the types of feature information that have been extracted, separating each of new information and registered information into the plurality of types of feature information before combined, and computing a plurality of degrees of similarity between separate sets of a same type of the feature information that have been respectively separated from the new information and the registered information, the new information being the hybrid feature information that has been newly generated, the registered information being the hybrid feature information that has been generated and stored in advance in a storage portion, and determining whether the biometric information on which the new information is based and the biometric information on which the registered information is based have been acquired from a same person, based on the plurality of the degrees of similarity that have been computed.

Exemplary embodiments further provide a computer-readable medium storing a hybrid biometric authentication program. The program includes instructions that cause a computer to perform the steps of extracting, from biometric information, a plurality of types of feature information that have mutually distinct properties, generating hybrid feature information by combining the plurality of the types of feature information that have been extracted, separating each of new information and registered information into the plurality of types of feature information before combined, and computing a plurality of degrees of similarity between separate sets of a same type of the feature information that have been respectively separated from the new information and the registered information, the new information being the hybrid feature information that has been newly generated, the registered information being the hybrid feature information that has been generated and stored in advance in a storage portion, and determining whether the biometric information on which the new information is based and the biometric information on which the registered information is based have been acquired from a same person, based on the plurality of the degrees of similarity that have been computed.

BRIEF DESCRIPTION OF THE DRAWINGS

Exemplary embodiments of the present disclosure will be described below in detail with reference to the accompanying drawings in which:

FIG. 6 is a data table that shows a relationship between a false acceptance rate (FAR) and a degree of similarity A that is obtained with an algorithm A;

FIG. 7 is a data table that shows a relationship between the FAR and a degree of similarity B that is obtained with an algorithm B;

FIG. 8 is a table of multiplication factors for modifying the FAR;

DETAILED DESCRIPTION

Figure 1:
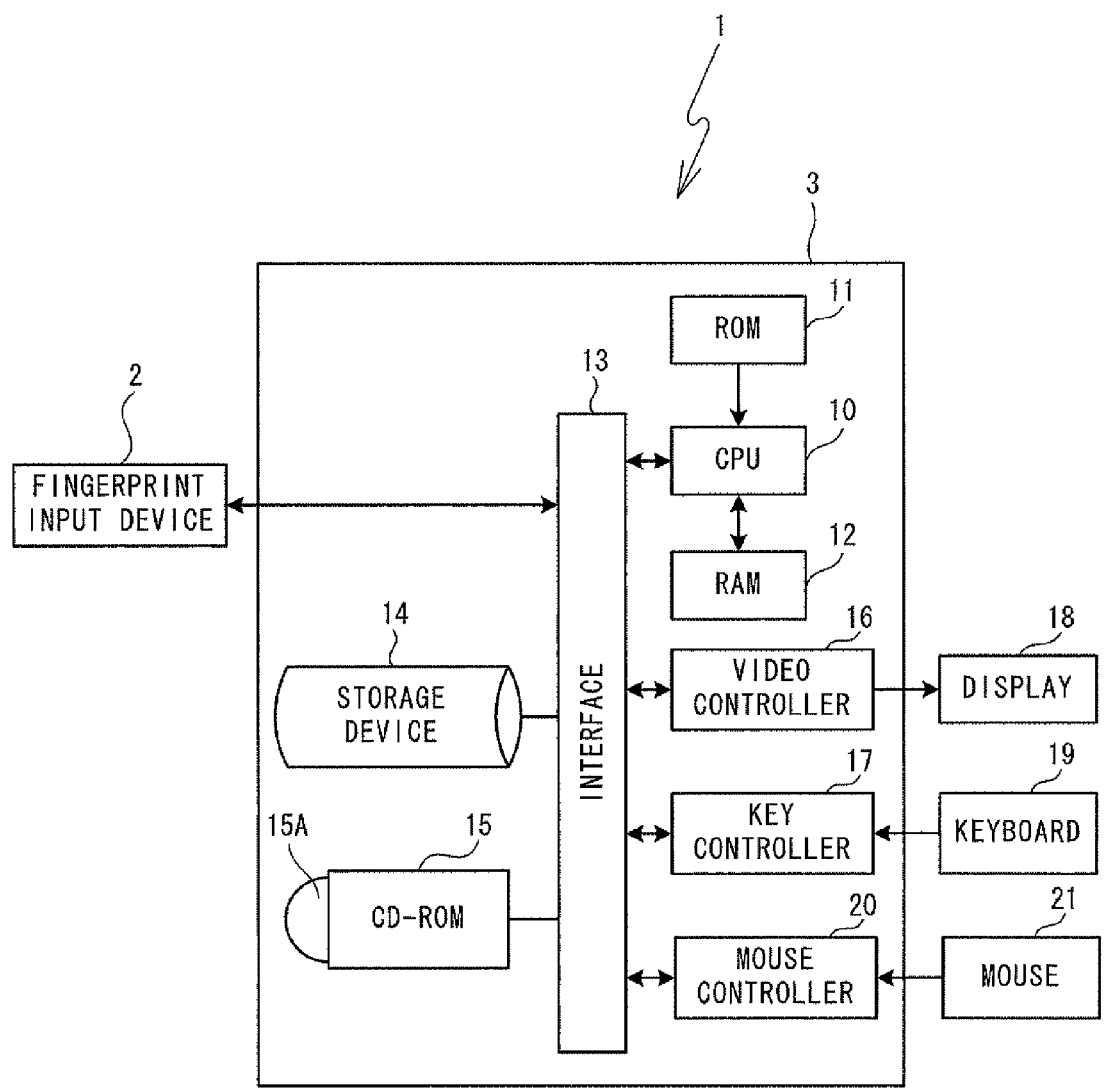
FIG. 1 is a block diagram of a individual authentication device.

Hereinafter, a individual authentication device 1 will be explained as an embodiment of the present invention. The individual authentication device 1 uses a fingerprint image as biometric information and employs the minutiae method and the frequency analysis method as algorithms that have mutually distinct properties and different performance. The biometric information may be acquired using a known biometric information input device. In a case where a user has failed in making an input, as well as in a case where a system failure has occurred, the biometric information input device performs appropriate feedback, such that the user is able to input the correct biometric information. The biometric information may be information such as a voice, an iris image, a face image, a fingerprint image, a vein image, or the like.

Generally, in biometric authentication, biometric feature information may be generated by performing biometric feature extraction, in which feature that are personally distinctive are extracted from the biometric information that is acquired by the biometric information input device. When the biometric information is enrolled, the biometric feature information may be stored in a database. Two sets of the biometric feature information may be compared, and how similar they are may be determined and expressed as a numerical value, which is called a degree of similarity. How dissimilar the two sets are may also be expressed as a numerical value, which is called a distance. In authentication and matching, one of the degree of similarity and the distance may be used as a standard, and based on its value, a determination may be made as to whether the two sets of the biometric feature information are acquired from a same person. The degree of similarity takes on a low value in a case where the two sets are not from the same person, and takes on a high value in a case where the sets are from the same person. The distance takes on a high value in a case where the two sets are not from the same person, and takes on a low value in a case where the two sets are from the same person. The determination as to whether the two sets of the biometric feature information are from the same person can be made based on a threshold value that is set in advance for the one of the degree of similarity and the distance to be used as the standard.

The biometric feature extraction according to the minutiae method may include extracting positions, types, and directions of feature points, such as bifurcations, ridge endings, and the like. The bifurcation is a point where a ridge, which is a continuous raised portion of a fingerprint, splits into two ridges. The ridge ending is a point where a ridge terminates. The biometric feature extraction in the minutiae method may also include extracting coordinates of the center of a fingerprint, coordinates of deltas, directions of ridges, distances between the feature points, the number of ridges between feature points, and the like. In the minutiae method, each of the features in the two sets of the biometric feature information that are extracted by the method described above are compared separately to determine to what extent they match each other. Then a ratio of matched features with respect to all the features in the entire fingerprint, for example, may be expressed as a numerical value and defined as the degree of similarity. A ratio of unmatched features, for example, may also be expressed as a numerical value and defined as the distance. The fingerprint matching by the minutiae method is a matching method that determines whether the two sets of the biometric feature information are from the same person, based on the value of either one of the degree of similarity and the distance thus obtained.

The biometric feature extraction according to the frequency analysis method treats contrasts in a fingerprint image as signal waveforms and derives a waveform spectral sequence. In the frequency analysis method, the two sets of the biometric feature information that are extracted by the method described above are compared using Dynamic Programming (DP) matching to determine to what extent they match each other. The degree of similarity may be obtained by expressing the extent to which the two sets are similar (they match each other) as a numerical value. Further, the distance may be obtained by expressing the extent to which they are dissimilar (they do not match) as a numerical value. The fingerprint matching in the frequency analysis method is a matching method that determines whether the two sets of the biometric feature information are from the same person, based on the value of either one of the degree of similarity and the value of the distance thus obtained. Note that DP matching is a method of matching spectral sequences that is generally used in voice recognition, and is characterized by being robust with respect to temporal expansion and compression (longitudinal expansion and compression in the case of a fingerprint image). The fingerprint matching according to the frequency analysis method is an image recognition method to which a one-dimensional frequency analysis method that is used for voice recognition is applied.

The minutiae method is capable of extracting features from a portion of a fingerprint image and performing matching on the extracted features. The frequency analysis method is capable of extracting features even from an image from which the features to be extracted cannot be detected by the minutiae method. Thus, the two biometric authentication algorithms significantly differ from each other in terms of the methods by which the algorithms extract the features, user friendliness, as well as their authentication performances. In the present embodiment, a hybrid biometric authentication device can be constructed that has properties of these algorithms.

Hereinafter, the present embodiment will be explained in detail with reference to the drawings. In the explanation that follows, the minutiae method is called algorithm A, and the frequency analysis method is called algorithm B.

The individual authentication device 1 that is shown in FIG. 1 may be embodied, for example, as a computer 3 in which an operating system (OS) is installed. The computer 3 may perform processing by reading and executing a specified program. Note that a computer 3 in which an operating system is not installed and that is directly controlled by a machine-language program may also be used as the individual authentication device 1. With the individual authentication device 1, a fingerprint input device 2 that is an example of a biometric information input device may be used, and a fingerprint image that is an example of biometric information may be read. Note that the input method of the fingerprint image is not limited to a method by which the image is input from the fingerprint input device 2. The fingerprint image that is acquired by the fingerprint input device 2 may be stored in a known storage device (a built-in hard disk, a built-in semiconductor memory, a portable storage medium, a removable storage medium, a hard disk or the like inside a server that is connected to a network, or the like), and the stored image may be used during one of enrollment and matching.

As shown in FIG. 1, the individual authentication device 1 according to the present embodiment includes a CPU 10 that performs main control, a ROM 11 in which a BIOS and the like are stored, a RAM 12 that stores various types of data temporarily, and an interface 13. The ROM 11, the RAM 12, and the interface 13 are connected to the CPU 10. A storage device 14, a CD-ROM device 15, and the fingerprint input device 2 are connected to the interface 13. The storage device 14 can be configured as a hard disk device, a flash memory, or the like. A CD-ROM 15A that is a storage medium for a computer program and data can be inserted into the CD-ROM device 15. A computer program that is read from the CD-ROM 15A may be stored in the storage device 14. A line-type fingerprint sensor, for example, may be employed as the fingerprint input device 2. The fingerprint input device 2, however, is not limited to a line-type fingerprint sensor, and a fingerprint input device of various types can be employed.

A video controller 16, a key controller 17, and a mouse controller 20 are also connected to the interface 13. A display 18 is connected to the video controller 16, a keyboard 19 is connected to the key controller 17, and a mouse 21 is connected to the mouse controller 20.

Figure 2:
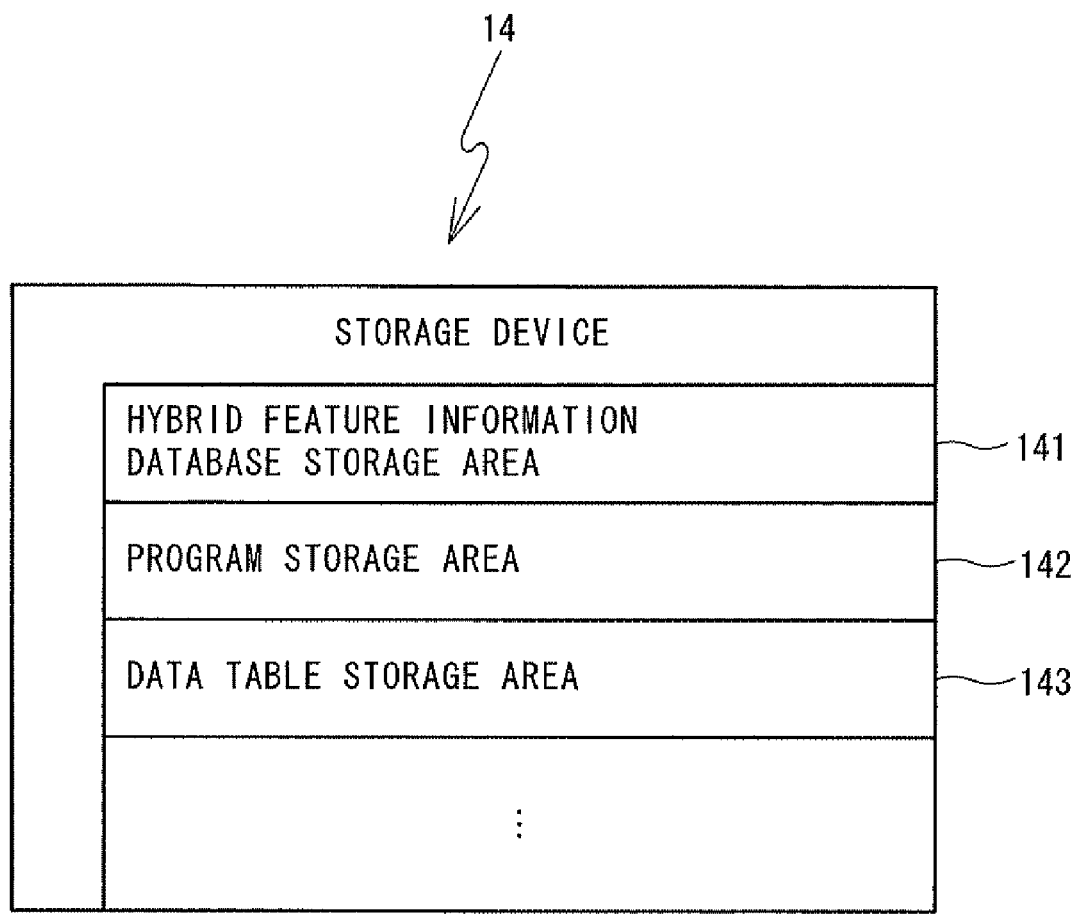
FIG. 2 is a conceptual diagram of storage areas in a storage device.

Storage areas in the storage device 14 will be explained with reference to FIG. 2. As shown in FIG. 2, the storage device 14 includes a hybrid feature information database storage area 141, a program storage area 142, a data table storage area 143, and the like. The storage device 14 may be configured from a known storage device, and stores hybrid feature information that is generated for enrollment, along with additional information (a file name, an ID, a name, and the like) for associating the feature information with a specific person.

Figure 3:
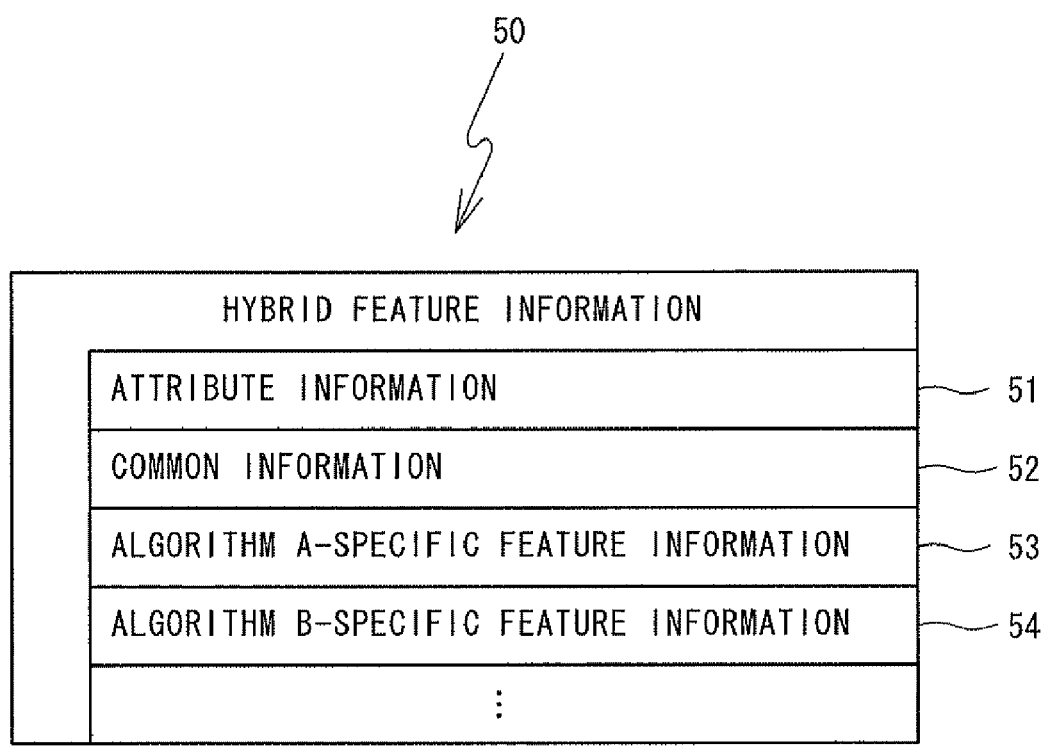
FIG. 3 is a conceptual diagram of hybrid feature information data.

Hybrid feature information 50 that is stored in the hybrid feature information database storage area 141 of the storage device 14 will be explained with reference to FIG. 3. As shown in FIG. 3, the hybrid feature information 50 includes attribute information 51, common information 52, algorithm A-specific feature information 53, and algorithm B-specific feature information 54.

Figure 4:
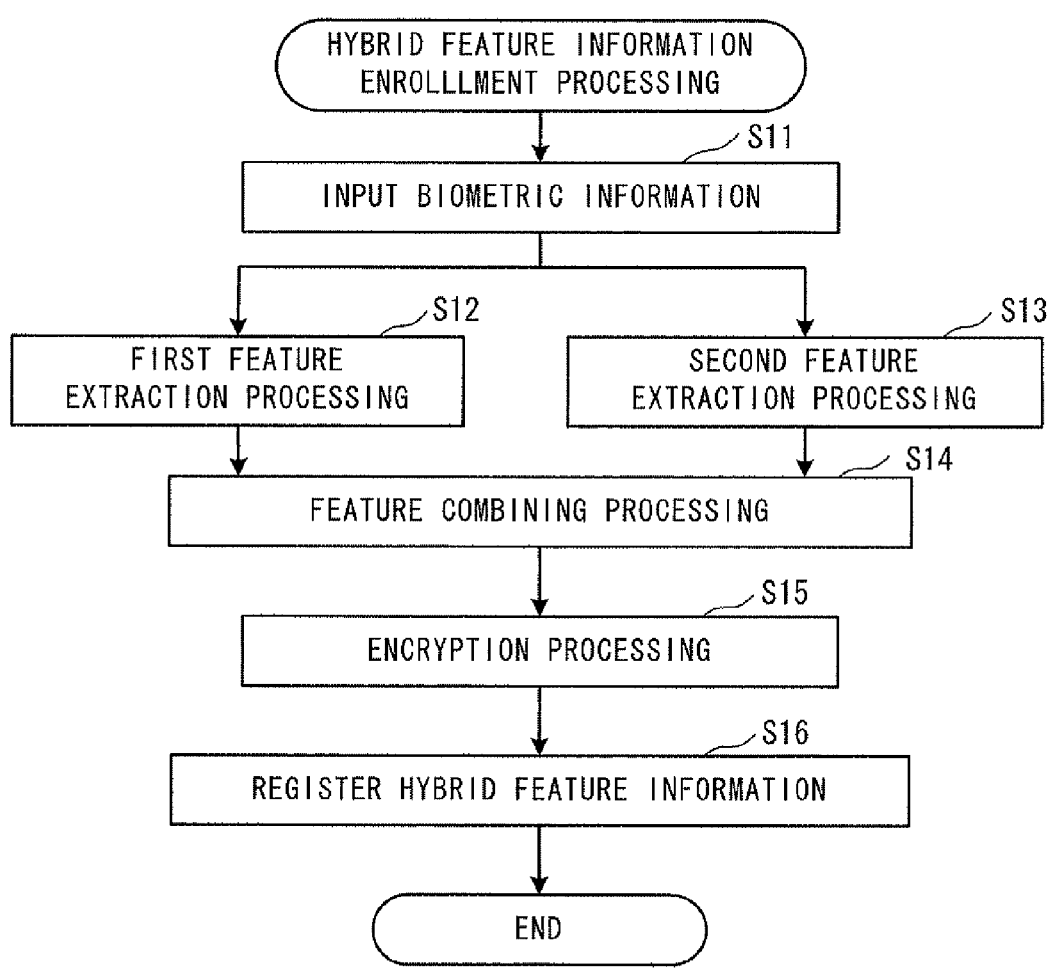
FIG. 4 is a flowchart of hybrid feature information enrollment processing.

Hybrid feature information enrollment processing that is performed by the CPU 10 of the individual authentication device 1 will be explained with reference to FIG. 4.

In the hybrid feature information enrollment processing, first, a fingerprint image that will be enrolled is input from the fingerprint input device 2 that is shown in FIG. 2 (Step S11). The fingerprint image that has been input is temporarily stored in the RAM 12. Next, first feature extraction processing according to algorithm A (Step S12) and second feature extraction processing according to algorithm B (Step S13) are performed in parallel.

When the fingerprint image (the biometric information) that was input at Step S1 is processed by the first feature extraction processing according to algorithm A (Step S12) and by the second feature extraction processing according to algorithm B (Step S13), respectively, two types of biometric feature information that have mutually distinct properties are extracted. Hereinafter, the biometric feature information that is extracted using algorithm A will be referred to as the first feature information, and the biometric feature information that is extracted using algorithm B will be referred to as the second feature information.

Feature combining processing (Step S14) is performed on the two types of biometric feature information that have been extracted, that is, on the first feature information and the second feature information. The hybrid feature information 50 is generated by the feature combining processing (Step S14).

Specifically, first, the attribute information 51 is generated. The attribute information 51 may include, for example, information as to whether the data are compressed, information as to whether the data are encrypted, a public key for encryption, the overall data volume of the hybrid feature information 50, the date and time that the information was created, and the like. The attribute information 51 may also include additional information, and information that is not necessary may be deleted from among the information exemplified above.

The first feature information and the second feature information that are respectively generated by the first feature extraction processing (Step S12) and the second feature extraction processing (Step S13) each include unique feature information that is uniquely produced by the corresponding algorithm, as well as information that is output irrespective of the algorithm. In other words, each of the two types of the biometric feature information includes a duplicated (identical) portion.

In the feature combining processing (Step S14), the first feature information and the second feature information that are respectively extracted by the first feature extraction processing (Step S12) and the second feature extraction processing (Step S13) are compared, and the duplicated portion in each feature information is identified. Then the common information 52 is generated by extracting the duplicated information that has been found. The common information 52 is the duplicated information that is included in both types of the biometric feature information. The common information 52 may include, for example, a sensor resolution of the fingerprint input device 2, a size of the fingerprint image that was input, a quality indicator for the fingerprint image, and the like. The size of the fingerprint image may be a size of the fingerprint image that is read from one of a file and the sensor that acquires the fingerprint image, and the size may be expressed by numerical values such as 280 pixels wide by 400 pixels high, for example. The quality indicator may indicate whether contrasts in the input fingerprint image make ridges and valleys clearly visible, whether the fingerprint was properly input, whether the size of the fingerprint image is suitable for fingerprint recognition, and the like. The quality indicator may be expressed as a numerical value from 0 (low quality) to 255 (high quality), for example.

The hybrid feature information 50 in an uncompressed state is generated by adding the algorithm A-specific feature information 53 and the algorithm B-specific feature information 54 to the attribute information 51 and the common information 52. The algorithm A-specific feature information 53 is a portion of the first feature information that is left after the common information 52 has been removed. The algorithm B-specific feature information 54 is a portion of the second feature information that is left after the common information 52 has been removed.

For example, in a case where the minutiae method is used as algorithm A, the algorithm A-specific feature information 53 may include biometric feature information such as the positions, the types, and the directions of the feature points, or the coordinates of the center of the fingerprint, the coordinates of the deltas, the directions of the ridges, the distances between the feature points, the number of the ridges between the feature points, or the like. In a case where the frequency analysis method is used as algorithm B, the algorithm B-specific feature information 54 may include waveform spectral sequence information that is derived as the biometric feature information by treating the contrasts in the fingerprint image as signal waveforms. The hybrid feature information 50 is information that is a combination of the algorithm A-specific feature information 53, the algorithm B-specific feature information 54, the common information 52, and the attribute information 51.

In the feature combining processing (Step S14), the data volume is reduced by compressing the hybrid feature information 50 in accordance with the system application. For example, Huffman encoding may be performed in order to compress the uncompressed hybrid feature information 50. Only a portion of the hybrid feature information 50 may be compressed, or the entire hybrid feature information 50 may be compressed. Compression may not necessarily be preformed. Another method other than that described above may be used for compression.

The combined feature information (hybrid feature information 50) may be encrypted using the Advanced Encryption Standard (AES), for example, in accordance with the application of the hybrid biometric authentication device (Step S15). Encryption processing may be performed in order to improve security. The encryption processing (Step S15) may also be performed by a different method. The encryption processing may not necessarily be preformed.

The data for which the feature combining processing (Step S14) and the encryption processing (Step S15) have been completed are registered as the hybrid feature information 50 in the hybrid feature information database storage area 141 of the storage device 14 that is shown in FIG. 2 (Step S16), and the hybrid feature information enrollment processing is terminated. The hybrid feature information 50 that is stored in the hybrid feature information database storage area 141 may be used in the matching of the biometric information.

Next, hybrid biometric authentication processing will be explained with reference to FIG. 5. In the hybrid biometric authentication processing, fingerprint matching is performed using the hybrid feature information 50 that was enrolled in the hybrid feature information enrollment processing (database registration processing (Step S16)). First, the fingerprint image that is an object on which the fingerprint matching will be performed is input from the fingerprint input device 2 that is shown in FIG. 1 (Step S21). Specifically, when the user places a finger on the fingerprint input device 2, a fingerprint image is input. The fingerprint image that has been input is temporarily stored in the RAM 12. Next, the first feature extraction processing according to algorithm A (Step S22) and the second feature extraction processing according to algorithm B (Step S23) are performed in parallel.

When the fingerprint image is processed as the biometric information by the first feature extraction processing according to algorithm A (Step S22) and by the second feature extraction processing according to algorithm B (Step S23), the two types of biometric feature information that have mutually distinct properties (the first feature information and the second feature information) are extracted.

Next, the feature combining processing (Step S24) is performed on the two types of biometric feature information that have been extracted. The hybrid feature information 50 is generated by the feature combining processing (Step S24).

The combined feature information (hybrid feature information 50) is encrypted using the AES encryption, in accordance with the purpose for which the hybrid biometric authentication device will be used (Step S25). The content of the processing at Steps S22 to S25 is the same as the content of the processing at Steps S12 to S15 of the previously described hybrid feature information enrollment processing, so the explanation of those steps applies here, and further explanation will be omitted.

Next, the hybrid feature information 50 that is stored in the hybrid feature information database storage area 141 of the storage device 14 that is shown in FIG. 2 (hereinafter referred to as registered information) is read in order to be matched with the hybrid feature information 50 that, in the processing at Steps S21 to S25, has been input as the biometric information from the fingerprint input device 2 and encrypted by the encryption processing (hereinafter referred to as new information) (Step S26). The registered information may be read in the order in which it was enrolled, in the reverse of the order in which it was enrolled, or in an order according to a specified standard.

Decryption processing is performed on the new information and the registered information to undo their respective encryptions (Step S27). The necessity of performing this processing may be determined by checking whether the attribute information 51 indicates that information has been encrypted.

Next, feature restoration processing is performed on the new information and the registered information that have been decrypted by the decryption processing (Step S27). The feature restoration processing restores each of the new information and the registered information back to the two types of the biometric feature information before they were combined (Step S28). In the feature extraction processing (Step S28), first, in a case where the attribute information 51 includes information that indicates that the compression has been performed, each of the new information and the registered information is respectively decompressed to the hybrid feature information 50 in the uncompressed state.

In the feature restoration processing (Step S28), separation processing is then performed on the decompressed new information and the decompressed registered information. In the separation processing, the two types of the biometric feature information that have mutually distinct properties are separated and restored based on the common information 52, the algorithm A-specific feature information 53, and the algorithm B-specific feature information 54 that were combined in the feature combining processing (Step S24).

Specifically, the common information 52 and the biometric feature information for algorithm A that is configured from the algorithm A-specific feature information 53 is separated and restored from each of the new information and the registered information. As described previously, in a case where the minutiae method is used as algorithm A, the algorithm A-specific feature information 53 may include the positions of the feature points and the like. The common information 52 may include the sensor resolution of the fingerprint input device 2 and the like. The common information 52 and the biometric feature information for algorithm B that is configured from the algorithm B-specific feature information 54 is also separated from each of the new information and the registered information. As described previously, in a case where the frequency analysis method is used as algorithm B, the algorithm B-specific feature information 54 may include the waveform spectral sequence information and the like.

In the processing up to this point, two sets of the biometric feature information for algorithm A and two sets of the biometric feature information for algorithm B are produced based on the two sets of the hybrid feature information 50 (the new information and the registered information).

A degree of similarity A between the two sets of the biometric feature information for algorithm A is computed by first similarity computation processing according to algorithm A (Step S29). In the present embodiment, the minutiae method is used as algorithm A, and the biometric feature information that includes the positions, the types, and the directions of the feature points, as well as the coordinates of the center of the fingerprint, the coordinates of the deltas, the directions of the ridges, the distances between the feature points, the number of the ridges between the feature points, and the like have been extracted. The extent to which the individual feature included in the two sets of the biometric feature information match each other is compared for each of the feature, and a ratio of matched features with respect to all the features in the entire fingerprint is expressed as a numerical value and defined as the degree of similarity A. For example, a matching ratio (0 to 100) that is computed by dividing the number of the positions of the feature points such as the bifurcations and the ridge endings that match each other by the total number of the feature points may be used as the degree of similarity A.

A degree of similarity B between the two sets of the biometric feature information for algorithm B is computed by second similarity computation processing according to algorithm B (Step S30). In the present embodiment, the frequency analysis method is used as algorithm B, and the biometric feature information has been obtained by treating the contrasts for the individual lines in the fingerprint image as signal waveforms and computing a waveform spectral sequence for each of the lines. The extent to which the two sets of the biometric feature information match each other is determined using DP matching. Specifically, the waveform spectral sequence for the individual lines are compared, taking into account positional discrepancies in the vertical direction (for each line), and the degree to which the sequences match (or do not match) each other is expressed as a numerical value from 0 to 1000, for example, and defined as the degree of similarity B.

An overall degree of similarity is computed by overall similarity computation processing, based on the degree of similarity A and the degree of similarity B that have been computed (Step S31). Hereinafter, an example of a computation method of an overall degree of similarity will be shown, and a method of determining various types of set values and threshold values will be explained. Note that in the overall similarity computation processing, one of a degree of similarity and a distance may be output, the degree of similarity expressing the degree of matching among a plurality of sets of the biometric feature information, and the distance expressing the degree of non-matching among the plurality of sets of the biometric feature information.

For the two biometric authentication algorithms that are used in the overall similarity computation processing (Step S31), relationships among the degree of similarity, a false acceptance rate (FAR) and a false rejection rate (FRR) are determined, and FAR conversion correspondence regions are set. In order to determine the relationships between the degree of similarity and the FAR and the FRR, a fingerprint image database may be used, in a case where fingerprint images are employed as the biometric information. An ideal fingerprint image database may have age and gender distribution of the test subjects that is the same as the age and gender distribution in the population at large, and stores a sufficient number of fingerprint images for computing the matching accuracy. In the present embodiment, a fingerprint image database is employed that stores 13,665 fingerprint images that have been acquired from 451 fingers of a total of 99 males and females, using a line type fingerprint sensor.

Figure 10:
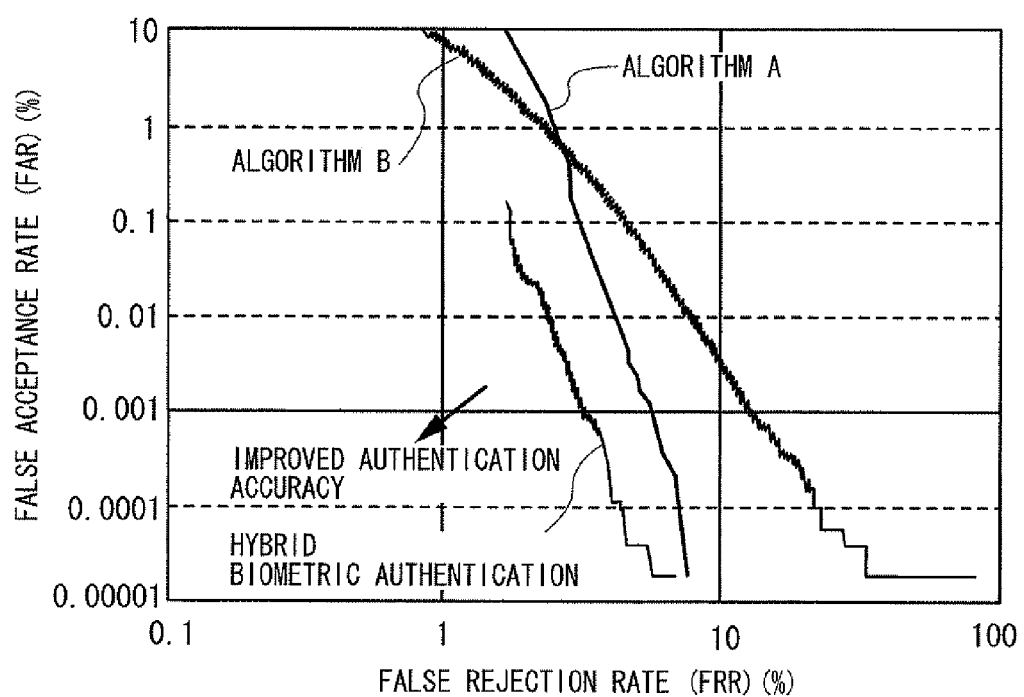
FIG. 10 is a graph of authentication results that are obtained using a hybrid type individual authentication device 1.

Using each of the minutiae method and the frequency analysis method, all of the fingerprint images in the fingerprint image database are compared and matched each other, and a relationship between FAR and FRR is obtained. The relationships among the degree of similarity, the FAR, and the FRR for each of the methods can be obtained by varying the threshold value for determining whether a fingerprint is from a same person or from another person, then calculating the FAR and the FRR for each threshold value. Examples of the obtained relationships are shown in FIG. 10. From this relationships, one of the methods that yields a lower FRR when the FAR is 0.001% may be determined as algorithm A (the minutiae method in the present embodiment). Then the other of the methods that yields a higher FRR when the FAR is 0.001% may be determined as algorithm B (the frequency analysis method in the present embodiment). A different method from that described above may also be used for determining algorithms A and B. For example, one of the methods that yields a higher FRR when the FAR is 0.01% may be determined as algorithm A, and the other may be determined as algorithm B.

The FAR conversion correspondence regions may be set as described below. For algorithm A, a range of values for the degree of similarity within which an individual's identity can be authenticated with an accuracy of FAR not greater than 0.0001% may be defined as a region A1. A range within which the corresponding FAR is from 0.0001% to 0.1% may be defined as a region A2. A range within which the corresponding FAR is from 0.1% to 2% may be defined as a region A3. A range within which the corresponding FAR is from 2% to 5% may be defined as a region A4. Further, a range within which the corresponding FAR is greater than 5% may be defined as a region A5. For algorithm B, a range of values for the degree of similarity within which an individual's identity can be authenticated with an accuracy of the FAR not greater than 0.00005% may be defined as a region B1. A range within which the corresponding FAR is from 0.00005% to 0.0001% may be defined as a region B2. A range within which the corresponding FAR is from 0.0001% to 0.001% may be defined as a region B3. A range within which the corresponding FAR is from 0.001% to 0.01% may be defined as a region B4. A range within which the corresponding FAR is from 0.01% to 0.1% may be defined as a region B5. A range within which the corresponding FAR is from 0.1% to 2% may be defined as a region B6. Further, a range within which the corresponding FAR is greater than 2% may be defined as a region B7. Note that the threshold values for setting the regions given above are only examples, and the threshold values may also be set to other values.

FIG. 6 shows a data table of the relationships between the FAR and the degree of similarity A for algorithm A that are determined as described above. Similarly, FIG. 7 shows a data table of the relationships between the FAR and the degree of similarity B for algorithm B. The data tables that are shown in FIGS. 6 and 7 are stored in the data table storage area 143 of the storage device 14 that is shown in FIG. 2, and the data tables are referenced by the CPU 10.

FIG. 8 shows a table of multiplication factors for modifying the FAR according to the regions A1 to A5 and B1 to B7 that are set based on the degree of similarity A and the degree of similarity B. Note that the values that are shown in FIGS. 6 to 8 are only examples, and different values may also be used.

Figure 9:
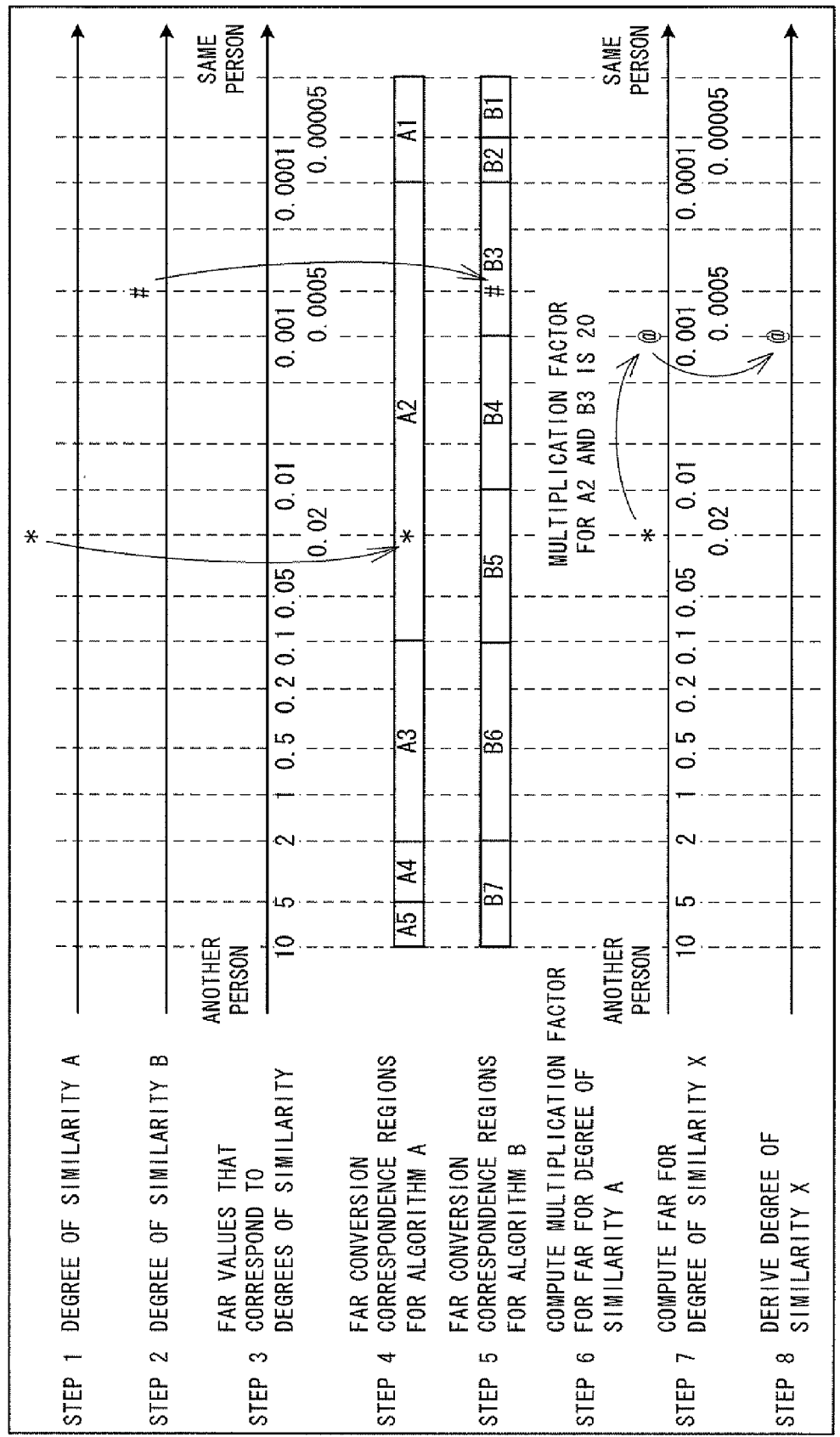
FIG. 9 is an explanatory figure of steps in overall similarity computation processing.

The overall similarity computation processing (Step S31) for computing an overall degree of similarity X based on the set values described above, will be explained with reference to FIG. 9. FIG. 9 is a figure that shows steps in the overall similarity computation processing (Step S31), and the processing is performed by the CPU 10 that is shown in FIG. 1.

Assume that the degree of similarity A that has been computed by the first similarity computation processing (Step S29) is 55 (indicated by the symbol * at Step 1 in FIG. 9). Also assume that the degree of similarity B that has been computed by the second similarity computation processing (Step S30) is 530 (indicated by the symbol # at Step 2 in FIG. 9). In this case, referring to the data table that is shown in FIG. 6 of the relationships between the FAR and the degree of similarity A, it can be determined that the FAR that corresponds to the degree of similarity A of 55 is 0.02% (Step 3 in FIG. 9).

Referring to the data table that is shown in FIG. 7 of the relationships between the FAR and the degree of similarity B, it can be determined that the FAR that corresponds to the degree of similarity B of 530 is 0.0005% (Step 3 in FIG. 9). The degree of similarity A of 55, that is, the FAR of 0.02%, belongs in the region A2 (as indicated by the symbol * at Step 4 in FIG. 9). Similarly, the degree of similarity B of 530, that is, the FAR of 0.0005%, belongs in the region B2 (as indicated by the symbol # at Step 5 in FIG. 9).

Referring to the table of the multiplication factors for modifying the FAR that is shown in FIG. 8, the multiplication factor that corresponds to the two regions is obtained (Step 6 in FIG. 9). The value of the multiplication factor that corresponds to the cell where the A2 row and the B3 column intersect in the table is 20. Using this value, the FAR of 0.02% in FIG. 9 is corrected such that the accuracy is twenty times higher. Specifically, the FAR of 0.02% is divided by 20, yielding a FAR of 0.001% (a shift from the symbol * to the symbol @ at Step 7 in FIG. 9). Referring to the data table that is shown in FIG. 6 of the relationships between the FAR and the degree of similarity A, the degree of similarity A of 75 that corresponds to the FAR of 0.001% is determined as the overall degree of similarity X (Step 8 in FIG. 9).

Alternatively, the corrected FAR that is computed at Step 7 (0.001%, the value indicated by the symbol @) and the FAR for algorithm B (0.0005%, the value indicated by the symbol #) may be compared, and the overall degree of similarity X may be computed based on the smaller of the two FAR values. In this case, because the FAR for algorithm B is smaller, the overall degree of similarity X is computed to be 80.

In a case where the degree of similarity A cannot be computed in the first similarity computation processing (Step S29), because one or both of the two sets of the biometric feature information for algorithm A contains invalid feature information, the FAR may be assumed to be 2%, for example (Step 1 and Step 3 in FIG. 9). In the same manner, in a case where the degree of similarity B cannot be computed in the second similarity computation processing (Step S30), because of invalid feature information, the FAR may be assumed to be 1%, for example (Step 2 and Step 3 in FIG. 9). Note that these provisionally computed FAR values are only examples, and different values may also be used.

In a case where the degree of similarity that results from the FAR conversion with reference to the data tables in FIGS. 6 to 8 exceeds a set value that is permitted by the system, a maximum value for the degree of similarity that will undoubtedly cause an authentication of the person is set as the overall degree of similarity X.

Furthermore, in a case where a combination of the region A5 and the region B7 is obtained, a minimum value of zero for the degree of similarity is set as the overall degree of similarity X.

Depending on the algorithms that are included in the overall similarity computation processing (Step S31) that is described above, the distance values, for which the greater than/less than relationships are the inverse of those for the degree of similarity values, may be used. Even in those cases, it is possible to derive an overall distance value by measuring the authentication accuracy of the algorithms in advance and defining the relationships between the FAR and the distance values in advance, in a similar manner as shown in FIGS. 6 and 7.

Determination processing is performed for the overall degree of similarity X that is output by the overall similarity computation processing (Step S31), using a threshold value that has been computed in advance (Step S32). For example, in a case where the threshold value is 60 (the FAR is 0.01%), the person who is an object of the authentication is authenticated if the overall degree of similarity X is at least 60 (YES at Step S32), and the person is determined to be another person if the overall degree of similarity X is less than 60 (NO at Step S32). In a case where the person who is the object of the authentication is authenticated (YES at Step S32), a biometric authentication result is output that indicate that the person who is the object of the authentication is who the person claims to be (Step S33).

The fingerprint image database that is used in the computing of the authentication accuracies of algorithm A and algorithm B may also be used in the setting of the threshold value that is used in the determination processing. With the overall degree of similarity X that is derived by the hybrid biometric authentication processing that is described above, the degree of separation between a person and another person can be made greater than with the degree of similarity A. Therefore, it is necessary to compute the FAR and the FRR again. As described previously, the fingerprint image database that is used in the present embodiment stores the 13,665 fingerprint images that have been acquired from 451 fingers of the total of 99 males and females, using the line-type fingerprint sensor.

In the present embodiment, algorithm A, which serves as the standard for the degree of similarity, is determined according to the following procedure:

(1) The database is constructed from the biometric information that is acquired using the system to which the present embodiment is applied. The biometric information is acquired from a sufficient number of the test subjects to compute the authentication accuracy of each of the biometric authentication algorithms to be used.

(2) The authentication accuracy of each of the biometric authentication algorithms to be used is computed using the aforementioned database. The algorithm that has resulted in the lowest FRR when the FAR is 0.001% is set as algorithm A. The value of 0.001% for the FAR is only an example, and the value that has been determined to be the standard authentication accuracy for the system may be used.

The FAR conversion correspondence regions for algorithm A may be determined by the procedure described below, for example. Note that the number of the regions may be increased or decreased, and the standard for dividing the regions may be changed, depending on the algorithm to be used.

(1) The range that includes the FAR value of 0.001% that is determined to be the standard authentication accuracy for algorithm A and within which the authentication accuracy may be modified depending on the system to which the present embodiment is applied is defined as the region A2. For example, in a case where the authentication accuracy of the system is set to FAR=0.0001% when security is prioritized, is normally set to FAR=0.001%, and is set to FAR=0.1% when convenience is prioritized, the corresponding range of values is defined as the region A2.

(2) For algorithm A, the range in which the FAR values indicate a higher probability of authenticity than in the region A2 is defined as the region A1.

(3) For algorithm A, the range from the region A2 to the FAR value where the FAR value and the FRR value become close is defined as the region A3. For algorithm A as used in the present embodiment, the FAR value where the FAR value and the FRR value become close is approximately 2%.

(4) For algorithm A, the range in which the FAR values are not less than the value that indicates that the person can undoubtedly be determined as another person is defined as the region A5. The range between the region A3 and the region A5 is defined as the region A4.

The FAR conversion correspondence regions for algorithm B may be determined by the procedure described below, for example. Note that the number of the regions may be increased or decreased, and the standard for dividing the regions may be changed, depending on the algorithm to be used.

(1) For algorithm B, the FAR value that is set as the standard authentication accuracy of the system is used. The obtained range is divided into three regions that are defined as the region B3, the region B4, and the region B5, starting from the region closer to the FAR value with which the person is undoubtedly authenticated. The number of the divisions is not limited to three, and may be any number n, such as 2, 4, or the like.

(2) For algorithm B, the ranges in which the FAR values indicate a higher probability of authenticity than in the region B3 are defined as the region B2 and the region B1. The region B1 may not necessarily be defined.

(3) For algorithm B, the range from the region B5 to the FAR value where the FAR value and the FRR value become close is defined as the region B6. For algorithm B as used in the present embodiment, the FAR value where the FAR value and the FRR value become close is approximately 1.8%.

(4) The range in which the FAR values indicate that the person can be determined as another person with a higher probability than in the region B6 is defined as the region B7.

The FAR multiplication factors may be determined by the procedure described below, for example. Note that the number of the regions may be increased or decreased, and the multiplication factors may be changed, depending on the authentication accuracy of the algorithms to be used and on the differences in the properties of the algorithms.

(1) A table like that in FIG. 8 is prepared.

(2) An initial value of 1 is assigned to every multiplication factor in every cell in the table. If the hybrid biometric authentication processing is performed with the table in this state, the degree of similarity X that is output is the same as the degree of similarity A.

(3) For algorithm A, a multiplication factor that is not less than 2 is assigned to the region A4 and the lower-numbered regions in which the person cannot be determined as another person without doubt. For algorithm B, a multiplication factor that is not less than 2 is assigned to the region B5 and the lower-numbered regions in which the FAR values are not greater than the FAR value that is set as the standard authentication accuracy of the system.

(4) Because the authentication accuracy of algorithm A is better, the multiplication factors in the row for the region A1 are made greater than the multiplication factors in the other rows.

(5) The multiplication factor in the cell where the region A1 row and the region B1 column intersect is made the largest multiplication factor.

(6) As an exception, in the cell where the region B7 column intersects the row for the region A5, in which the FAR values indicate that the person can undoubtedly be determined as another person, the multiplication factor is set such that the degree of similarity X that is output will have the lowest value, that is, a value that indicates that the person is undoubtedly another person.

The FAR conversion correspondence regions and the FAR multiplication factors are optimized through experimentation based on the FAR conversion correspondence regions and the FAR multiplication factors that have been set by the methods described above.

Figure 5:
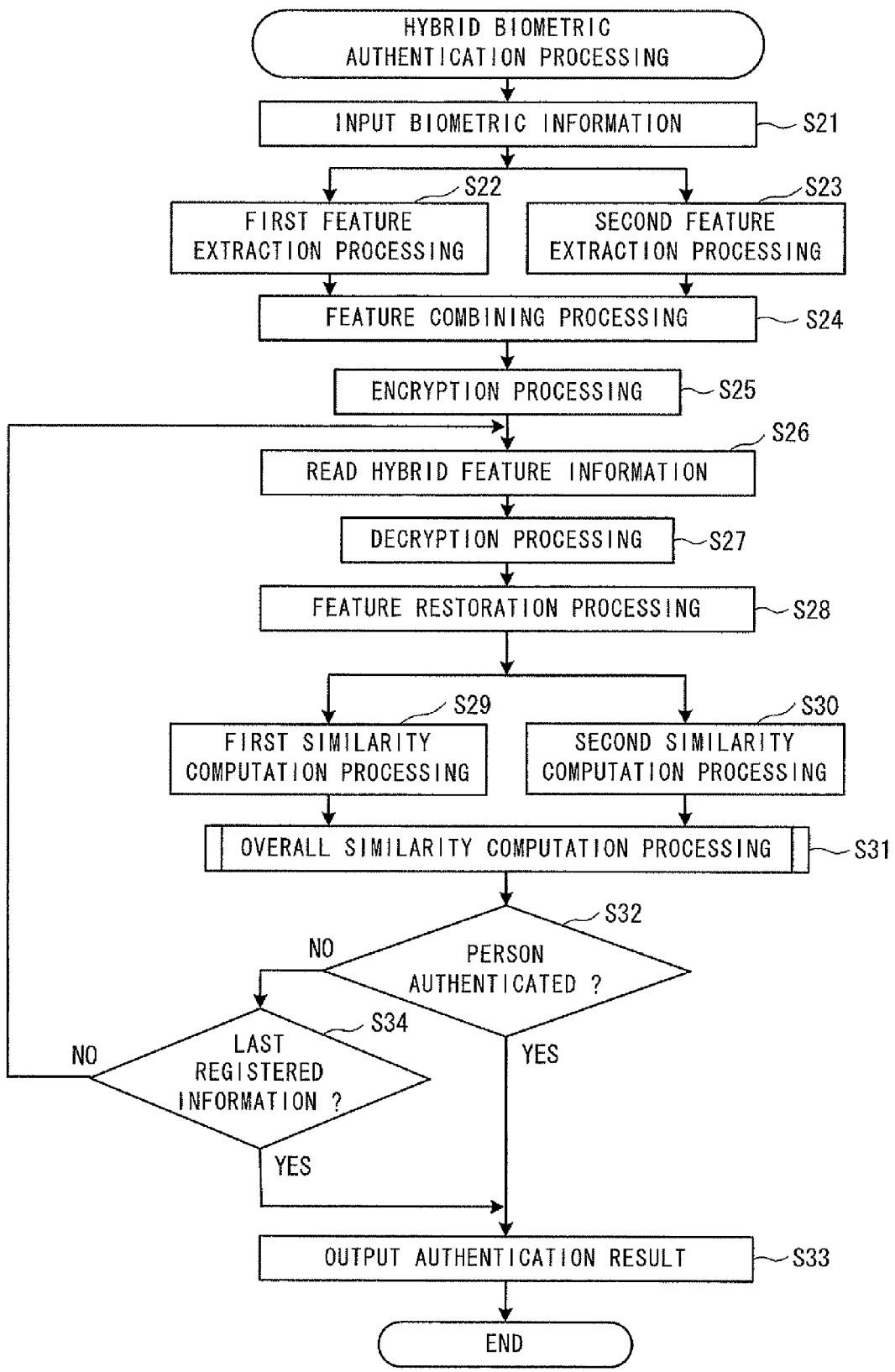
FIG. 5 is a flowchart of hybrid biometric authentication processing.

In the hybrid biometric authentication processing that is shown in FIG. 5, in a case where, in the determination processing at Step S32, the person who is the object of the authentication is not authenticated (NO at Step S32), a determination is made as to whether the hybrid feature information 50 that has been used for the authentication is the last registered set of information (Step S34). The determination is made based on whether information that has not yet been used for authentication exists within the hybrid feature information 50 that is stored in the hybrid feature information database storage area 141 (refer to FIG. 2). In a case where the information that has been used for the authentication is the last registered set of information (YES at Step S34), a biometric authentication result is output that indicates that the person who is the object of the authentication has been determined to be another person (Step S33). In a case where the information that has been used for the authentication is not the last registered set of information (NO at Step S34), the processing returns to Step S26. Then the next set of the hybrid feature information 50 that is stored in the hybrid feature information database storage area 141 is read, and the processing at Steps S27 to S32 is performed in the same manner as described above. After the biometric authentication result is output (Step S33), the hybrid biometric authentication processing is terminated.

FIG. 10 shows results that verify the effect of the hybrid type individual authentication device 1 that was used as an example in the present embodiment. The fingerprint input device 2 that was used for acquiring the fingerprints is a device that is provided with an electrical field type of line sensor. The fingerprint images were acquired and input to the individual authentication device 1, where the fingerprint images were registered in the hybrid feature information database storage area 141 of the storage device 14. The registered data were acquired from 451 fingers of 99 test subjects. FIG. 10 is a logarithmic graph of the false acceptance rate (FAR) and the false rejection rate (FRR). In FIG. 10, the authentication accuracy improves toward the lower left of the graph. It can be seen that the authentication accuracy of the hybrid biometric authentication that uses algorithm A and algorithm B in combination is better than in a case where the authentication is performed using algorithm A only or using algorithm B only.

Thus, using the hybrid biometric authentication that utilized two types of biometric authentication algorithms has improved authentication accuracy as compared to the case of using only one authentication algorithm, and it has also improved convenience for the user.

According to the present embodiment that is described above, an improvement in the authentication accuracy can be achieved in the hybrid biometric authentication device without impairing the convenience and without increasing the cost.

Furthermore, in the hybrid biometric authentication device that is described above, one set of the biometric information is acquired by one biometric information input device, and a plurality of biometric feature information items are generated from the biometric information and matched. This method allows the user to input the biometric information only once, using only the one biometric information input device. Therefore, the present embodiment that is described above does not impair convenience as compared to the known method. There is also no increase in cost, because only the one biometric information input device is used.

Various types of modifications can be made to the present embodiment. For example, three or more types of biometric authentication algorithms that have mutually distinct properties and different authentication performance may be used as the biometric authentication algorithms, instead of just the two types of algorithms. Information other than fingerprints, such as a vein, an iris, a palm print, or the like, may also be used as the biometric information. The degree to which two sets of biometric feature information are similar to one another may also be expressed by the distance (a score), instead of by the degree of similarity.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A hybrid biometric authentication device, comprising:
   a plurality of feature extraction portions that respectively extract, from biometric information, a plurality of types of feature information that have mutually distinct properties;
   a feature combining portion that generates hybrid feature information by combining the plurality of types of feature information respectively extracted by the plurality of the feature extraction portions;
   a feature information storage portion that stores the hybrid feature information generated by the feature combining portion;
   a plurality of similarity computation portions that separate each of new information and registered information into the plurality of types of feature information before combined, and compute a plurality of degrees of similarity between separate sets of a same type of the feature information that have been respectively separated from the new information and the registered information, the new information being the hybrid feature information newly generated by the feature combining portion, the registered information being the hybrid feature information stored in advance in the feature information storage portion; and
   a determination portion that, based on the plurality of degrees of similarity computed by the plurality of similarity computation portions, determines whether the biometric information on which the new information is based and the biometric information on which the registered information is based have been acquired from a same person.

2. The hybrid biometric authentication device according to claim 1, wherein
   the plurality of feature extraction portions and the plurality of similarity computation portions each use a corresponding plurality of algorithms that have mutually distinct properties and different authentication performance.

3. The hybrid biometric authentication device according to claim 1, wherein
   the plurality of similarity computation portions, in a case where at least one of the plurality of types of feature information extracted by the plurality of feature extraction portions from the biometric information input from a biometric information input device is invalid for at least corresponding one of the plurality of algorithms, compute the plurality of degrees of similarity using information that indicates that the at least one of the plurality types of feature information is invalid.

4. The hybrid biometric authentication device according to claim 1, wherein
the feature combining portion combines the plurality of types of feature information after removing information included in all of the plurality of types of feature information respectively extracted by the plurality of feature extraction portions, then generates one set of the hybrid feature information by compressing and encrypting the combined information in accordance with a system application.

5. The hybrid biometric authentication device according to claim 4, wherein
the plurality of similarity computation portions respectively decrypt and decompress the new information and the registered information, then respectively compute the plurality of degrees of similarity between the separate sets of the same type of feature information among the plurality of types of feature information.

6. The hybrid biometric authentication device according to claim 1, wherein
the determination portion includes:
an overall degree of similarity computation portion that, in accordance with a standard degree of similarity that is one of the plurality of degrees of similarity computed by the plurality of the degree of similarity computation portions and in accordance with another of the plurality of the degrees of similarity that is not the standard degree of similarity, computes a single overall degree of similarity by one of increasing and decreasing a value of the standard degree of similarity; and
an overall determination portion that, based on the overall degree of similarity computed by the overall similarity computation portion, determines whether the biometric information on which the new information is based and the biometric information on which the registered information is based have been acquired from the same person.

7. The hybrid biometric authentication device according to claim 6, wherein
the determination portion determines that the biometric information on which the new information is based and the biometric information on which the registered information is based have been acquired from the same person in a case where the overall degree of similarity computed by the overall degree of similarity computation portion is not less than a specified threshold value, and determines that the biometric information on which the new information is based and the biometric information on which the registered information is based have not been acquired from the same person in a case where the overall degree of similarity is less than the specified threshold value.

8. A hybrid biometric authentication method, comprising the steps of:
extracting, from biometric information, a plurality of types of feature information that have mutually distinct properties;
generating hybrid feature information by combining the plurality of the types of feature information that have been extracted;
separating each of new information and registered information into the plurality of types of feature information before combined, and computing a plurality of degrees of similarity between separate sets of a same type of the feature information that have been respectively separated from the new information and the registered information, the new information being the hybrid feature information that has been newly generated, the registered information being the hybrid feature information that has been generated and stored in advance in a storage portion; and
determining whether the biometric information on which the new information is based and the biometric information on which the registered information is based have been acquired from a same person, based on the plurality of the degrees of similarity that have been computed.

9. The hybrid biometric authentication method according to claim 8, wherein
a plurality of algorithms that have mutually distinct properties and different authentication performance are used both in the step of extracting the plurality of types of feature information and in the step of computing the plurality of degrees of similarity.

10. The hybrid biometric authentication method according to claim 8, wherein
in the step of computing the plurality of degrees of similarity, the plurality of degrees of similarity are computed, in a case where at least one of the plurality of types of feature information that have been extracted from the biometric information that has been input from a biometric information input device is invalid for at least one of the plurality of algorithms, using information that indicates that the at least one of the plurality of types of feature information is invalid.

11. The hybrid biometric authentication method according to claim 8, wherein
in the step of generating the hybrid feature information, one set of the hybrid feature information is generated by combining the plurality of types of feature information after removing information that is included in all of the plurality of types of feature information that have been extracted, then compressing and encrypting the combined information in accordance with a system application.

12. The hybrid biometric authentication method according to claim 11, wherein
in the step of computing the plurality of degrees of similarity, the new information and the registered information are decrypted and decompressed, and the plurality of the degrees of similarity between the separate sets of the same type of feature information among the plurality of types of feature information are then computed.

13. The hybrid biometric authentication method according to claim 8, wherein
in the step of determining based on the plurality of degrees of similarity, a single overall degree of similarity is computed by one of increasing and decreasing a value of a standard degree of similarity that is one of the plurality of degrees of similarity that have been computed, in accordance with the standard degree of similarity and in accordance with another of the plurality of degrees of similarity that is not the standard degree of similarity, and then the determination is made, based on the overall degree of similarity, as to whether the biometric information on which the new information is based and the biometric information on which the registered information is based have been acquired from the same person.

14. The hybrid biometric authentication method according to claim 13, wherein in the step of determining based on the plurality of degrees of similarity, a determination is made that the biometric information on which the new information is based and the biometric information on which the registered information is based have been acquired from the same person in a case where the overall degree of similarity is not less than a specified threshold value, and a determination is made that the biometric information on which the new information is based and the biometric information on which the registered information is based have not been acquired from the same person in a case where the overall degree of similarity is less than the specified threshold value.

15. A non-transitory computer-readable medium storing a hybrid biometric authentication program, the program comprising instructions that cause a computer to perform the steps of:
   extracting, from biometric information, a plurality of types of feature information that have mutually distinct properties;
   generating hybrid feature information by combining the plurality of the types of feature information that have been extracted;
   separating each of new information and registered information into the plurality of types of feature information before combined, and computing a plurality of degrees of similarity between separate sets of a same type of the feature information that have been respectively separated from the new information and the registered information, the new information being the hybrid feature information that has been newly generated, the registered information being the hybrid feature information that has been generated and stored in advance in a storage portion; and
   determining whether the biometric information on which the new information is based and the biometric information on which the registered information is based have been acquired from a same person, based on the plurality of the degrees of similarity that have been computed.

16. The non-transitory computer-readable medium according to claim 15, wherein
   a plurality of algorithms that have mutually distinct properties and different authentication performance are used both in the step of extracting the plurality of types of feature information and in the step of computing the plurality of degrees of similarity.

17. The non-transitory computer-readable medium according to claim 16, wherein
   in the step of computing the plurality of degrees of similarity, the plurality of degrees of similarity are computed, in a case where at least one of the plurality of types of feature information that have been extracted from the biometric information that has been input from a biometric information input device is invalid for at least one of the plurality of algorithms, using information that indicates that the at least one of the plurality of types of feature information is invalid.

18. The non-transitory computer-readable medium according to claim 15, wherein
   in the step of generating the hybrid feature information, one set of the hybrid feature information is generated by combining the plurality of types of feature information after removing information that is included in all of the plurality of types of feature information that have been extracted, then compressing and encrypting the combined information in accordance with a system application.

19. The non-transitory computer-readable medium according to claim 18, wherein
   in the step of computing the plurality of degrees of similarity, the new information and the registered information are decrypted and decompressed, and the plurality of the degrees of similarity between the separate sets of the same type of feature information among the plurality of types of feature information are then computed.

20. The non-transitory computer-readable medium according to claim 15, wherein
   in the step of determining based on the plurality of degrees of similarity, a single overall degree of similarity is computed by one of increasing and decreasing a value of a standard degree of similarity that is one of the plurality of degrees of similarity that have been computed, in accordance with the standard degree of similarity and in accordance with another of the plurality of degrees of similarity that is not the standard degree of similarity, and then the determination is made, based on the overall degree of similarity, as to whether the biometric information on which the new information is based and the biometric information on which the registered information is based have been acquired from the same person.

* * * * *